(12) United States Patent
Schumacher et al.

(10) Patent No.: US 8,186,106 B2
(45) Date of Patent: May 29, 2012

(54) HIGH STRENGTH CEMENT, MORTAR AND CONCRETE INCLUDING INDUSTRIAL BY-PRODUCTS

(75) Inventors: Glenn Schumacher, Baltimore, MD (US); Rajeshkumar Patel, Catonsville, MD (US); Paul Sampson, Monkton, MD (US); Michael Riley, Towson, MD (US)

(73) Assignee: CeraTech, Inc., Alexandria, VA (US)

( * ) Notice: Subject to any disclaimer, the term of this patent is extended or adjusted under 35 U.S.C. 154(b) by 0 days.

(21) Appl. No.: 13/197,613

(22) Filed: Aug. 3, 2011

(65) Prior Publication Data

US 2011/0283922 A1 Nov. 24, 2011

Related U.S. Application Data

(62) Division of application No. 12/017,956, filed on Jan. 22, 2008, now Pat. No. 8,016,937.

(60) Provisional application No. 60/881,316, filed on Jan. 19, 2007.

(51) Int. Cl.
C04B 1/00 (2006.01)
(52) U.S. Cl. .......... 52/3; 106/705; 106/713; 106/DIG. 1
(58) Field of Classification Search .................. 106/705, 106/713, DIG. 1; 52/3
See application file for complete search history.

(56) References Cited

U.S. PATENT DOCUMENTS

| | | | |
|---|---|---|---|
| 3,144,347 A | 8/1964 | Cowan | |
| 3,856,541 A | 12/1974 | Martin | |
| 4,230,765 A | 10/1980 | Takahashi et al. | |
| 4,313,763 A | 2/1982 | Turpin, Jr. | |
| 4,997,484 A | 3/1991 | Gravitt et al. | |
| 5,556,458 A | 9/1996 | Brook et al. | |
| 5,605,571 A | 2/1997 | Buerge et al. | |
| 6,641,658 B1 | 11/2003 | Dubey | |
| 7,288,148 B2 | 10/2007 | Hicks et al. | |
| 7,442,248 B2 | 10/2008 | Timmons | |
| 2003/0089281 A1 | 5/2003 | Berke et al. | |
| 2005/0160946 A1 | 7/2005 | Comrie | |
| 2005/0252420 A1 | 11/2005 | Timmons | |
| 2006/0025312 A1 | 2/2006 | Santra et al. | |

FOREIGN PATENT DOCUMENTS

| | | |
|---|---|---|
| EP | 1 344 754 | 9/2003 |
| EP | 1 380 554 | 1/2004 |

OTHER PUBLICATIONS

International Search Report and Written Opinion mailed May 7, 2008, directed at counterpart international application No. PCT/US2008/51664; 12 pages.
International Search Report and Written Opinion mailed Mar. 11, 2011, directed to application No. PCT/US11/20822; 11 pages.
Schumacher et al., U.S. Office Action mailed Feb. 22, 2012, directed to U.S. Appl. No. 13/004,303; 17 pages.
Russian Official Action mailed Dec. 22, 2011, directed to Russian Application No. 2009131446/03(043981); 11 pages.

*Primary Examiner* — Paul Marcantoni
(74) *Attorney, Agent, or Firm* — Morrison & Foerster LLP

(57) ABSTRACT

Cementitious compositions in which the cementitious properties of fly-ash are carefully controlled. The cementitious compositions may be substantially free harsh acids and bases such as citric acids (≈pH 2.2) and alkali metal activators including alkali hydroxides (≈pH 12-14) and metal carbonates (≈pH 11.6). The use of these harsh chemicals creates acid base reactions during use of the products. Instead of these harsh chemicals, a citric salt, for example potassium citrate, may be used as a reaction accelerator. Boric compounds may be used as a retarder in the compositions.

2 Claims, 3 Drawing Sheets ary pplication Ser. No. 12/017,956...

HIGH STRENGTH CEMENT, MORTAR AND CONCRETE INCLUDING INDUSTRIAL BY-PRODUCTS

CROSS-REFERENCE TO RELATED APPLICATIONS

This application is a divisional of U.S. patent application Ser. No. 12/017,956, filed on Jan. 22, 2008, which claims the benefit of U.S. Provisional Application Ser. No. 60/881,316, filed on Jan. 19, 2007, the contents of which are incorporated herein by reference.

FIELD OF THE INVENTION

A novel family of compositions is disclosed for the production of blended hydraulic cementitious materials and their concrete and mortar derivatives for original construction, repair, precast block, armor, spray and other applications. These materials exhibit controlled reactions of calcium-containing industrial byproducts with chemical activators, retarders, bond enhancers and mechanical strength modifiers.

BACKGROUND OF THE INVENTION

Materials with pozzolanic properties contain glassy silica and alumina that will, in the presence of water and free lime, react with the calcium in the lime to produce calcium silicate hydrates. There are both natural and industrial pozzolans.

Industrial pozzolans are produced during industrial processes and include, for example, Class C and Class F fly-ashes. These fly-ashes are produced during the combustion of coal. They consist of inorganic, incombustible matter present in the coal that has been fused during combustion into a glassy, amorphous structure. The classification of industrial produced fly-ash depends on the type of coal used. The combustion of lignite or subbituminous coal typically produces Class C fly-ash. The combustion of anthracite and bituminous coal typically produces Class F fly-ash.

As defined by ASTM C618, the characteristics of Class C fly-ash include higher lime content than Class F fly-ash. The higher lime content in Class C fly-ash allows Class C fly-ash to be self-hardening, while Class F fly-ash typically requires the addition of additional lime or cement to form cementitious materials.

An example of a natural pozzolan is Class N pozzolanic ash. Class N pozzolanic ash is a raw or calcined natural pozzolan such as some diatomaceous earths, opaline cherts, and shales; tuffs, volcanic ashes, and pumicites; and calcined clays and shales.

The chemical and physical attributes of Class C, Class F and Class N pozzolanic ashes are further defined by ASTM-C618, the contents of which are hereby incorporated by reference in their entirety.

It is known to use fly-ash in cement compositions, typically in the presence of Portland cement. U.S. Pat. No. 5,556,458 to Brook, et al., for example, requires at least 20% Portland cement. In particular, Brook, et al. notes that Portland cement is required in their composition to overcome the low early strength of fly ash compositions.

U.S. Pat. No. 4,997,484 to Gravitt et al. and U.S. Pat. No. 7,288,148 to Hicks et al. disclose fly-ash cement compositions without Portland cement, but rely on an acid-base reaction system that utilize the combined effects of citric acid ($\approx$pH 2.2) and either an alkali hydroxide ($\approx$pH 12-14) or metal carbonate ($\approx$pH 11.6). However, the fly-ash cement compositions of Gravitt and Hicks do not exhibit the strength and hardness required by many cement applications.

BRIEF SUMMARY OF THE INVENTION

Described are cementitious compositions in which the cementitious properties of natural and/or industrial pozzolan powders are carefully controlled. The cementitious compositions may be substantially free of strong acids and bases such as citric acids ($\approx$pH 2.2) and alkali metal activators including alkali hydroxides ($\approx$pH 12-14) and metal carbonates ($\approx$pH 11.6). Instead of relying on the traditional acid-base chemistry to activate or accelerate cement hydration, the present invention relies on a pH neutral hydration activator or accelerator. According to the invention, a pH neutral hydration activator is the primary activator. According to preferred embodiments, the pH of the activator is between 6 and 9. According to more preferred embodiments, the pH of the activator is between 6.5 and 8.5 Other activators having a pH outside of these ranges may be present in the cement compositions in small amounts, provided that a pH neutral activator is present in a weight percentage of greater than 50% of the total activator content of the cement composition. Stated alternatively, activators having a pH of lower than about 6 or higher than about 9, should be present in a total amount of less than 50% by weight, preferably less than 30% by weight, and more preferably less than 25% by weight, of the total weight of all combined activators in the cement composition. Examples of activators having a pH outside of the range of 6 and 9 include citric acid, alkali metal activators such as potassium hydroxide, and alkali metal carbonates such as potassium hydroxide.

pH neutral activators that may be used according to the invention include citric salts, malic acid, malonic acid, glycolic acid and the salts of these acids, and calcium nitrate. For the purposed of this invention, the term "pH neutral" shall mean having a pH between 6 and 9.

According to a preferred embodiment of the invention, a neutral pH citric salt, for example potassium citrate, is used as the activator. A single citric salt or a combination of citric salts may be used as the sole activator. Alternatively, the citric salt or salts may be used in combination with other known activators, provided that activators having a pH of lower than 6 or higher than 9 are present in a total amount of less than 50% by weight, preferably less than 30% by weight, and more preferably less than 25% by weight, of the total weight of all combined activators in the cement composition. Boric compounds or other conventional retarders may be used in the compositions.

The cement may include Class C fly-ash, Class F fly-ash, Class N pozzolanic ash, either alone or in combination. The cement may also include other additives, including silica fume, calcium aluminate, magnesium oxide, lime, one or more retarding additives from the borate salt family (for example, boric acid or borax), organic retarders such as sodium gluco-heptonate, reactive clays such as meta-kaolin, wollastonite, air entraining agents (AEA), latex, fibers (for fracture toughness), shrinkage compensation additives, and water reducers. Where the primary pozzolan powder is Class F fly ash or Class N pozzolanic ash, the cement includes one or more calcium-rich materials, preferably industrial byproducts such as cement kiln dust, lime kiln dust, furnace slag and scrubber ash.

The disclosed cements may be used alone or blended with other cements such as Portland cement, slag cements, and other types of conventional cements. However, the cements of the present invention do not require the presence of other cements in order to exhibit their superior properties. Accordingly, cements according to the invention may be substantially free of Portland cement.

For the purposes of this invention, the phrase "substantially free" shall mean present in an amount of less than 1 weight percent based on the total weight of the referenced composition.

The cementitious compositions may also include one or more fillers in addition to the cement.

Cement compositions according to the present invention are characterized by unexpectedly high dimensional stability, strength, hardness, working times, permeability, sulfate resistance, freeze-thaw resistance, mitigation of alkali-aggregate reactivity and/or setting times.

According to an embodiment, the hydratable cement comprises: a pozzolan powder; one or more pH neutral activators; and a retarder, wherein the hydratable cement has a calcium content expressed as the oxides of 15 wt % or more based on the total weight of the hydratable cement, and wherein the pH neutral activators account for greater than 50% of the total weight of activators in said hydratable cement and wherein the hydratable cement has less than 20% by weight Portland cement based on the total weight of the hydratable cement.

According to another embodiment, the hydratable cement comprises a citrate salt activator, wherein said citrate salt activator comprises greater than 95% of the total weight of activators in said hydratable cement.

According to another embodiment, the hydratable cement comprises: a pozzolan powder; two or more activators, at least one of which has a pH between about 6 and about 9; and a retarder, wherein the hydratable cement has a calcium content expressed as the oxides of 15 wt % or more based on the total weight of the hydratable cement; and wherein said activator having a pH of between about 6 and about 9 accounts for greater than 50% of the total weight of the activators in said hydratable cement.

According to another embodiment, a cementitious composition comprises a hydratable cement comprising: a pozzolan powder; two or more activators, at least one of which has a pH between about 6 and about 9; and a retarder, wherein the hydratable cement has a calcium content expressed as the oxides of 15 wt % or more based on the total weight of the hydratable cement, and wherein said activator having a pH of between about 6 and about 9 accounts for greater than 50% of the total weight of activators in said hydratable cement; and one or more aggregate fillers. The aggregate fillers may be selected from the group consisting of silica sand, natural sand, manufactured fine aggregate from stone production, bottom ash, slag, ground glass, recycled foundry sand and combinations thereof. The cementitious composition has a working time of between 10 minutes and 2 hours, or it may have a working time of greater than 2 hours.

According to another embodiment, a cementitious composition comprises a hydratable cement comprising: a pozzolan powder; one or more pH neutral activators; and a retarder, wherein the hydratable cement has a calcium content expressed as the oxides of 15 wt % or more based on the total weight of the hydratable cement, and wherein the pH neutral activators account for greater than 50% of the total weight of activators in said hydratable cement and wherein the hydratable cement has less than 20% by weight Portland cement based on the total weight of the hydratable cement; and one or more aggregate fillers.

According to another embodiment, an article of manufacture comprises a hydrated and hardened cement composition comprising a pozzolan powder; two or more activators, at least one of which has a pH between about 6 and about 9; and a retarder, wherein the hydratable cement has a calcium content expressed as the oxides of 15 wt % or more based on the total weight of the hydratable cement; and wherein said activator having a pH of between about 6 and about 9 accounts for greater than 50% of the total weight of activators in said hydratable cement.

According to another embodiment, an article of manufacture comprises a hydrated and hardened cement composition comprising: a pozzolan powder; one or more pH neutral activators; and a retarder, wherein the hydratable cement has a calcium content expressed as the oxides of 15 wt % or more based on the total weight of the hydratable cement, and wherein the pH neutral activators account for greater than 50% of the total weight of activators in said hydratable cement and wherein the hydratable cement has less than 20% by weight Portland cement based on the total weight of the hydratable cement.

According to certain embodiments, the article of manufacture may be a road, bridge or runway surface or other pavement, curb, sidewalk, pre-cast block, armor or armor plating, building, road, bridge or other structural foundation; building columns and beams and other structural elements; building partitions, including walls, floors, and ceilings; sprayable surface coverings or other sprayable applications.

According to other embodiments, the hydratable cement may have Portland cement in an amount less than 20% by weight, and more preferably less than 15% by weight, based on the total weight of the hydratable cement.

According to other embodiments, the hydratable cement may have Portland cement in amounts less than 10% by weight, less than 5% by weight, and less than 2% by weight, based on the total weight of the hydratable cement.

According to another embodiment, the hydratable cement is substantially free of Portland cement.

According to another embodiment, the hydratable cement may have a calcium content expressed as the oxides of 20 wt % or more based on the total weight of the hydratable cement.

According to another embodiment, the hydratable cement may have a calcia to silica molar ratio of between about 1.2:1 and about 1.4:1.

According to other embodiments, the hydratable cement may have alkali metal activators in amounts of less than 30% by weight, and more preferably less than 25% by weight, of the total weight of activators in said hydratable cement.

According to other embodiments, the hydratable cement may have alkali metal activators in amounts less than 20% by weight, less than 15% by weight, less than 10% by weight, less than 5% by weight, and less than 2% by weight, based on the total weight of activators in said hydratable cement.

According to other embodiments, the hydratable cement may have alkali metal carbonates in amounts of less than 30% by weight, and more preferably less than 25% by weight, of the total weight of activators in said hydratable cement.

According to other embodiments, the hydratable cement may have alkali metal carbonates in amounts less than 20% by weight, less than 15% by weight, less than 10% by weight, less than 5% by weight, and less than 2% by weight, based on the total weight of activators in said hydratable cement.

According to other embodiments, the hydratable cement may have citric acid in an amount of less than 30% by weight, and more preferably less than 25% by weight, of the total weight of activators in said hydratable cement.

According to other embodiments embodiment, the hydratable cement may have citric acid in amounts less than 20% by weight, less than 15% by weight, less than 10% by weight, less than 5% by weight, and less than 2% by weight, based on the total weight of activators in said hydratable cement.

According to another embodiment, the pozzolan powder is selected from the group consisting of Class C fly-ash, Class F fly-ash, Class N pozzolanic ash and combinations thereof.

According to another embodiment, the pozzolan powder consists essentially of Class C fly-ash and Class F fly-ash, wherein the Class C fly-ash is present in an amount of 50-80 weight percent, and the Class F fly-ash is present in an amount of 10-30 weight percent based on the total weight of the hydratable cement.

According to another embodiment, the hydratable cement may comprise a calcium rich material additive, preferably an industrial byproduct selected from the group consisting of cement kiln dust, lime kiln dust, furnace slag, scrubber ash, and combinations thereof.

According to another embodiment, the pozzolan powder consists essentially of Class C fly-ash.

According to another embodiment, the hydratable cement may comprise 50 to 95 weight percent Class C fly-ash based on the total weight of the hydratable cement.

According to another embodiment, the pozzolan powder consists essentially of Class F fly-ash, and wherein the hydratable cement further comprises a calcium-rich material additive.

According to another embodiment, the hydratable cement may comprise 0.5 to 50 weight percent Class F fly-ash based on the total weight of the hydratable cement.

According to another embodiment, the pozzolan powder consists essentially of Class N pozzolanic ash, and wherein the hydratable cement further comprises a calcium-rich material additive.

According to another embodiment, the hydratable cement may comprise 0.5 to 50 weight percent Class N pozzolanic ash based on the total weight of the hydratable cement.

According to another embodiment, the retarder comprises a borate compound, preferably in an amount of 0.1 to 3.0 weight percent, based on the total weight of hydratable cement.

According to another embodiment, the hydratable cement comprises sulfates or organic compounds.

According to another embodiment, the hydratable cement comprises potassium citrate or sodium citrate, preferably in an amount of 0.1 to 15 weight percent potassium citrate based on the total weight of the hydratable cement.

According to another embodiment, the hydratable cement comprises an additive selected from the group consisting of silica fume, calcium aluminate, magnesium oxide, lime, reactive clays such as meta-kaolin, wollastonite, air entraining agents (AEA), latex, fibers, water reducers and combinations thereof.

DETAILED DESCRIPTION OF THE INVENTION

Prior to the present invention, it was generally believed that high temperature sintering (in the case of Portland cement) or a strong acid-base chemistry (in the case of prior part pozzolanic cements) was necessary to provide the strength and hardness required by most cement applications. Contrary to this prevailing view, the inventors discovered that by using pH neutral activators, citric salts in particular, cement products can be produced that have unexpectedly superior properties compared to Portland cement or to pozzolanic cements prepared according to traditional acid-base activator chemistries.

Described are cementitious compositions in which the cementitious properties of pozzolan powders are carefully controlled and need not utilize the traditional acid-base chemistry. Instead, one or more pH neutral activators, for example a citric salt such as potassium citrate, are used as a reaction activator. Other examples of pH neutral activators include malic acid, malonic acid, glycolic acid, and salts of these acids, calcium nitrate and other nitrate salts. The pH neutral activator dissolves or dissociates in the presence of fly-ash and allows the hydration reaction with the fly-ash, upon the addition of water, to proceed in a uniform, well controlled manner. Boric compounds, or other conventional retarders, may be used in the compositions to slow or modify the hydration reaction. This controlled reaction approach allows for working times in ranges from as little as 10 minutes to 2 hours or more.

Embodiments of this invention may also include combinations of pozzolanic materials, for example, both Class C and Class F fly-ash. The reaction of Class C fly-ash can produce considerable heat, and this heat can cause early-stage shrinkage as the product is placed. This shrinkage can result in cracking and delamination from a substrate. Class F fly-ash contains little or no CaO, and is slowly reactive with the potassium citrate activator. Accordingly, the inclusion of some Class F fly-ash in the reaction mixture moderates the reaction forming the solid product by uniformly distributing strong, uniformly sized glass microspheres throughout the mixture.

As described herein, the use of this controlled pH neutral reaction chemistry allows for the creation of a crystal phase that is more stable than the crystal phases obtained by Portland cement and by Class C fly-ash based cements that rely on the acid-base reaction between citric acid and metal hydroxide(s) activator(s).

$C_3S_{1.5-2.0}$ Crystal Structure

Figure 1:
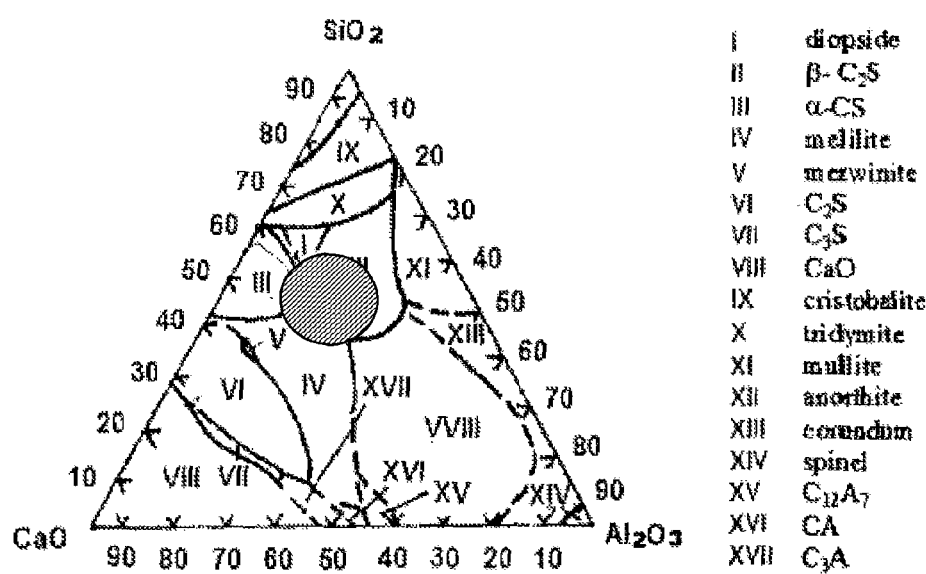
FIG. 1 is a ternary phase diagram of the crystallized phases in a $CaO—Al_2O_3—SiO_2$ system.

Portland cement and other ash-based cements are all based on crystallized phases of the calcium oxide-aluminum oxide-silicon oxide system. Crystallized phases of this system are shown in the ternary phase diagram in FIG. 1.

In this phase diagram, Portland cement is typically characterized by the $C_3S$ or $C_2S$ crystal structure. Class C fly-ash based cements that rely on the acid-base reaction between citric acid and metal hydroxide(s) activator(s) are typically characterized by the $C_{2-2.5}S$ crystal structure.

Figure 2:
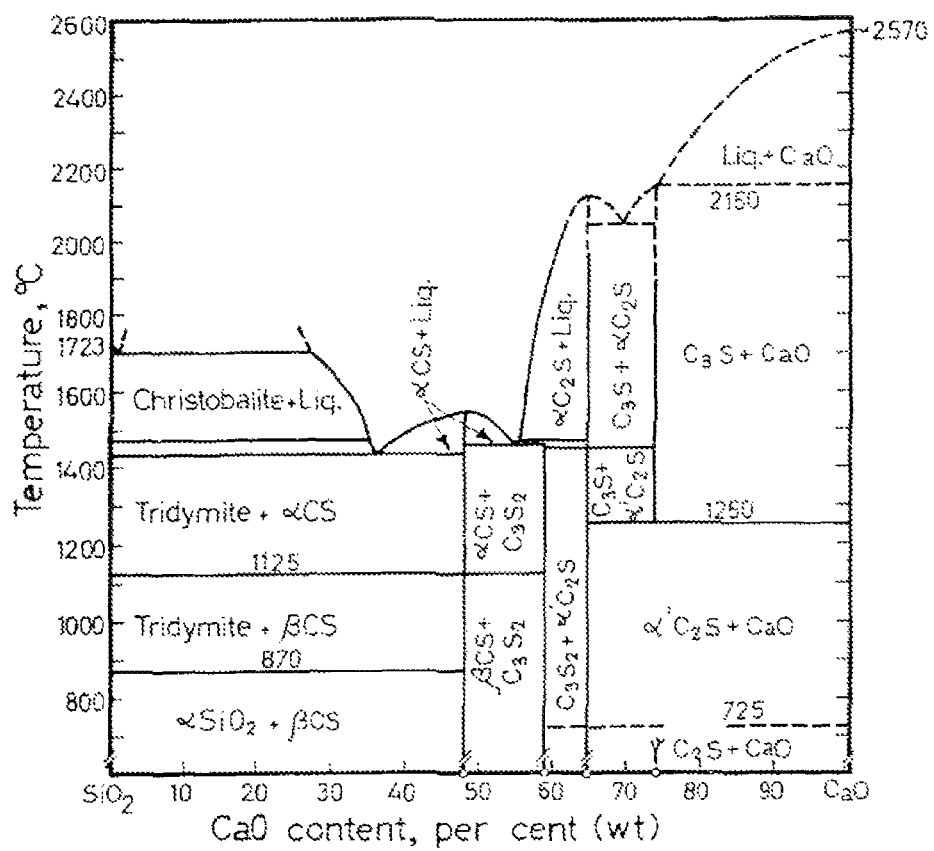
FIG. 2 is a phase diagram for the system $CaO—SiO2$.

Mathematical analysis indicates that embodiments described herein are characterized by a $C_3S_{1.5-2.0}$ structure, which is believed to provide the unique properties of the compositions. This phase falls in the shaded area of FIG. 1 and represents a crystal structure most closely resembling the mineral structure known as Rankinite, which when hydrated converts to the mineral structure known as afwillites and $CaO.SiO_2.0.35H_2O$. This phase is also shown in the binary phase diagram, of FIG. 2 as $C_3S_2$ and occurs between 50 and 60% $SiO_2$.

Figure 3:
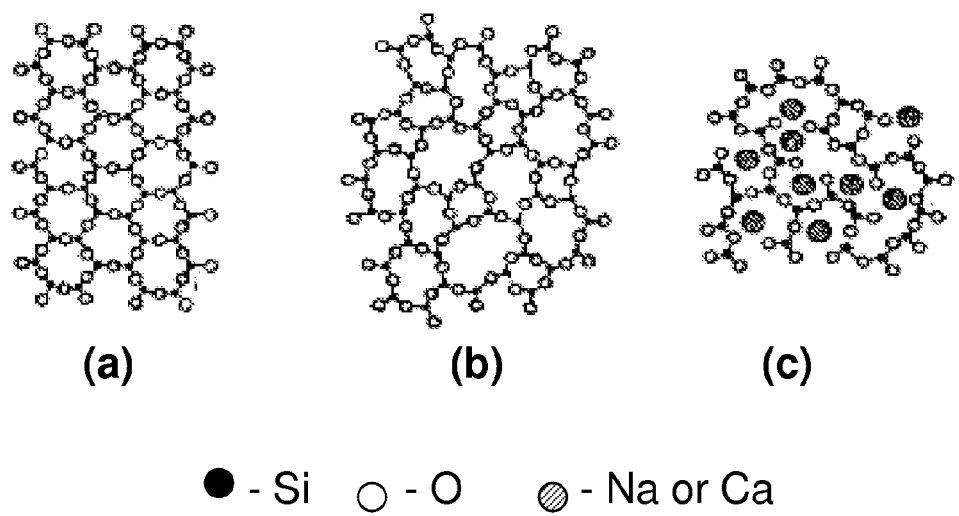
FIG. 3 is a two-dimensional representation of ordered, poorly ordered, and disordered structures.

In comparing the three systems: Portland cement, acid-base ash cements, and the neutral reaction chemistry cements described herein, the crystal ordering shown in FIG. 3 shows how the $C_3S_{1.5-2.0}$ structure believed to characterize the cements of the present invention form the most stable crystal structure of the three different systems. FIG. 3 is a two-dimensional representation of ordered, poorly ordered, and disordered structures. The materials utilizing the $C_3S_{1.5-2.0}$ structure described herein are represented by FIG. 3(a); the crystal structure of Class C fly ash cements prepared according to standard acid-base reactions are represented by FIG. 3(b), and the crystal structure of Portland cement is represented by FIG. 3(c). By achieving the desired balance in the CS molar ratio, a high-strength amorphous structure may result.

In order to achieve these preferred structures, the cement materials, upon reaction with water, preferably include hydrates having calcia to silica molar ratios (C:S) of from about 1:1 to about 1.8:1, typically from about 1.1:1 to about 1.5:1. As particular examples, the C:S molar ratio may be about 1.2:1, 1.3:1 or 1.4:1. The relative amounts of calcium-containing industrial by-products (e.g., Class C fly-ash) and low-calcium or siliceous industrial by-products (e.g., Class F fly-ash) may be selected in order to achieve the desired C:S molar ratio.

Materials

The cements according to the present invention may include the materials set forth below, in amounts expressed in terms of weight percentage of the entire cement composition, not including sand, stone and other fillers. The term "cement" is generally used herein to refer to the binder composition. The term "cementitious composition" is generally used herein to refer to the combination of the cement (or binder) and filler, for example sand, stone, and the like. The cementitious compound typically includes from about 5 to about 60 percent cement.

1) Natural or industrial pozzolan powders. Examples of pozzolan powders include Class C fly-ash, Class F fly-ash, and Class N pozzolanic ash. The cementitious compounds may include Class C fly-ash as a high calcium-containing pozzolan powder. In some embodiments, Class C fly ash may be included in the cement in the range of about 50 to about 95 weight percent, within the range of about 60 to about 85 weight percent, or within the range of about 70 to about 85 weight percent. Preferably, the calcium content expressed as the oxides (CaO) of the high calcium containing pozzolan powder is higher than about 22 weight percent and is in the range of about 22 to about 30 weight percent. If the CaO content is low, additional lime bearing components such as calcium hydroxide, nitrate or carbonates may be added. Note that although the use of Class C fly-ash as the high calcium-containing pozzolan powder is primarily described herein, other types of calcium-containing pozzolan powders may be used in some embodiments as partial or total substitutes for the Class C fly-ash (for example, blast furnace slag, cement kiln dust, and lime kiln dust).

The cement may additional or alternatively include one or more relatively low calcium or high silicon containing pozzolan powders. Preferably, the cement includes at least one pozzolan powder with a calcium content expressed as the oxides of less than about 22 weight percent or, more preferably, less than about 15 weight percent. In some embodiments, Class F fly-ash may, for example, be present in the range of about 0.5 to about 50 weight percent, within the range of about 1 to about 25 weight percent, or within the range of about 2 to about 15 weight percent. Although the use of Class F fly-ash as the low-calcium pozzolan powder is primarily described herein, other types of relatively low calcium and/or high silicon pozzolan powders may be used in some embodiments as partial or total substitutes for the Class F fly-ash (for example, Class N pozzolanic ash, volcanic ash, bottom ash, wood ash, municipal incinerator ash, zeolites etc.) To the extent that low calcium content pozzolanic powders comprise a large proportion of the pozzolanic powder component, calcium-rich materials must be added to the composition to provide the required calcium content. Preferred calcium-rich materials include industrial byproducts such as blast furnace slag, cement kiln dust, lime kiln dust and scrubber ash.

Silica fume may be used in the cement to increase short term strength, long term strength, bond strength, elastic properties and/or thermal properties. When present, silica fume may be present, for example, in the range of about 0.5 to about 10 weight percent, or within the range of about 1 to about 7 weight percent.

Preferably, the cement comprises a total calcium content expressed as the oxides of 15 weight percent or more. If the CaO content is low, additional lime bearing components such as calcium hydroxide, nitrate or carbonates may be added to achieve this calcium content.

2) Calcium aluminate may be used to increase the short-term strength of the product. Calcium aluminate may, for example, be present in the range of about 1 to about 25 weight percent, or within the range of about 5 to about 20 weight percent.

3) Magnesium oxide may be used to enhance volume stability of the product. Magnesium oxide may, for example, be present in the range of about 0.5 to about 15 weight percent, or within the range of about 2 to about 10 weight percent.

4) Lime (CaO or CaOH) additions can be used to enhance product workability, act as a shrinkage compensator, and/or function as a retarder. Lime may, for example, be present in the range of about 0.1 to about 5 weight percent. The amount of lime added to the composition may be dependent upon the amount of lime present in the fly-ash.

5) Borates may be used as strength gain retarders. Preferred borates include one or more retarding additives from the borate salt family, for example borax may be present in the range of about 0.1 to about 5 weight percent, 0.1 to 3 weight percent, or from 0.1 to about 2 weight percent. Boric acid may also or alternatively be used as the borate may, for example, be present in the range of about 0.1 to about 2 weight percent, or within the range of about 0.2 to about 1.7 weight percent. Other borates such as potassium tetraborate and sodium tetraborate hydrates may additionally or alternatively be used. These borates may be added to increase bond strength to the existing substrate and as a retarder. Other known retarders including sulfates and organic compounds can be used in addition to or in the alternative to the borates.

6) A single or multiple activators from the citric salt family may be included. For example, potassium citrate, calcium citrate, and/or sodium citrate may, for example, be present in the range of about 0.1 to about 15 weight percent, compared to the total weight of the cement, or from about 2 to about 5 weight percent, compared to the total weight of the cement. These activators may be the only activators present in the cement. Alternatively, other non-pH neutral activators may be present, provided that pH neutral activators make up 50% or more of the activator component.

Other examples of pH neutral activators that may be used in place of or in addition to a citric salt activator include malic acid, malonic acid, glycolic acid, and salts of these acids, calcium nitrate and other nitrate salts.

7) Miscellaneous ingredients including, for example, reactive clays such as meta kaolin, wollastonite, air entraining agents (AEA), latex, fibers (for fracture toughness), shrinkage compensators, and water reducers.

In some embodiments, the cements of the present invention are substantially free of Portland cement, slag cements, and other types of conventional cements. In other embodiments, the cements of the invention may include other cements, including Portland cement, provided that such other cements comprise less than about 20 weight percent, preferably less than about 15 weight percent, and more preferably less than 10 weight percent, of the total weight of the cement.

Embodiments may also or alternatively be substantially free of alkali metal activators such as alkali hydroxides (≈pH 12-14) and metal carbonates (≈pH 11.6) as used in other types of materials. Embodiments may also or alternatively be substantially free of citric acids (≈pH 2.2) and or other acids stronger than boric acid.

Cementitious compositions according to the invention may include one or more fillers in addition to the cement. According to some embodiments, the fine aggregate (sand) particle sizes can range from fine silica sand to naturally or manufactured sand to conform to ASTM specifications. These fillers may include, for example, silica sand, natural sand, manufactured fine aggregate from stone production, bottom ash, slag, ground glass and/or recycled foundry sands. Specific examples of fillers include different aggregate gradations, such as C33 sand, NJ 60 sand, C144 sand, #8 stone, and #57 stone.

This invention will be better understood with reference to the following examples, which are intended to illustrate specific embodiments within the overall scope of the invention.

EXAMPLES

Table 1 sets forth the weight percentages for different cements described in examples herein. Table 2 sets forth the weight percentage of cement, sand and aggregate in cementitious compositions described in examples herein. For each example in Table 1, additional formulations are envisioned, including plus and minus 25 percent, plus and minus 15 percent, and plus and minus 10 percent variations in weight percentage of the each ingredient.

Concrete Repair Products

Ex. #1

The ingredients listed in Table 1 and 2 were blended together and subsequently hydrated with 5.94 weight percent water, compared to the total weight of the ingredients in Tables 1 and 2, prior to use. This produced a product with the following characteristics:

TABLE 3

Ex. #1

| Property | Results 4 in. × 8 in. cylinders | Test Method |
| --- | --- | --- |
| Compressive Strengths, psi (MPa) | | |
| 4 hours | 2800 (15.9) | ASTM C 39 |
| 1 day - 24 hours | 3614 (24.9) | ASTM C 39 |
| 7 days | 6200 (42.7) | ASTM C 39 |
| 28 days | 9212 (63.5) | ASTM C 39 |
| Bond Strength, psi (MPa) | | |
| 1 day - 24 hours | 2256 (15.5) | ASTM C 882 |
| 7 days | 3274 (22.6) | ASTM C 882 |
| Flexural Strength, psi (MPa) | | |
| 7 days | 834 (5.8) | ASTM C 78 |
| 28 days | 997 (6.9) | ASTM C 78 |
| Tensile Strength, psi (MPa) | | |
| 24 hours | 528 (3.7) | ASTM C 496 |
| 7 days | 784 (5.4) | ASTM C 496 |
| 28 days | 902 (6.2) | ASTM C 496 |

TABLE 1

| Materials | Ex. #1 | Ex. #2 | Ex. #3 | Ex. #4 | Ex. #5 | Ex. #6 | Ex. #7 | Ex. #8 |
| --- | --- | --- | --- | --- | --- | --- | --- | --- |
| Class C fly-ash | 78.5 | 62.7 | 63.3 | 81.1 | 78.8 | 76.1 | 53.4 | 64.8 |
| Class F fly-ash | 12.7 | 2.2 | | 12.4 | 9.8 | 14.6 | 27.9 | 18.5 |
| Silica Fume | | 1.7 | 2.3 | | 4.4 | 1.6 | 3.5 | 2.4 |
| Calcium Aluminate | | 17.0 | 16.2 | | | | | |
| Magnesium Oxide | 3.8 | 11.8 | 13.9 | | | | 8.1 | 1.8 |
| Lime | | | | | 0.7 | 1.5 | | 1.8 |
| Aluminum Sulfate | | | | | 0.7 | | | 0.9 |
| Boric Acid | 1.1 | | 0.4 | 0.6 | 0.6 | 0.2 | 0.9 | 1.2 |
| Borax | | 1.9 | 0.46 | 0.8 | 0.3 | 2.0 | | 1.4 |
| Wollastonite | | | | | | | 2.3 | |
| Potassium Citrate | 3.9 | 2.5 | 3.2 | 4.7 | 4.5 | 3.1 | 2.3 | 7.4 |
| Fibers | | | | 0.04 | | 0.7 | 1.1 | |
| Water Reducers | | | 0.16 | | | | 0.2 | |
| Latex | | 0.03 | | | | | | |
| Air Entraining Agent (AEA) | 0.001 | 0.003 | 0.002 | 0.001 | 0.001 | 0.001 | | |

TABLE 2

| Materials | Ex. #1 | Ex. #2 | Ex. #3 | Ex. #4 | Ex. #5 | Ex. #6 | Ex. #7 | Ex. #8 |
| --- | --- | --- | --- | --- | --- | --- | --- | --- |
| Cement | 26.4 | 29.6 | 43.0 | 20.9 | 18.5 | 19.75 | 43.0 | 54.0 |
| C33 Sand | 31.8 | 30.40 | 39.03 | 37.00 | 34.20 | 42.05 | | 46.00 |
| NJ 60 Sand | | | | | | | 57.00 | |
| #8 Stone | 41.8 | 39.93 | 17.91 | | | | | |
| #57 Stone | | | | 42.10 | 47.30 | 38.20 | | |

TABLE 3-continued

Ex. #1

| Property | Results 4 in. × 8 in. cylinders | Test Method |
|---|---|---|
| Scaling Resistance, | | |
| 50 cycles | 0 | ASTM C 672 |
| Modulus of Elasticity, $10^5$ psi (GPa) | | |
| 28 days | 5.5 (3.7) | ASTM C 469 |
| Coefficient of Thermal Expansion, in/in/° F. | | |
| 28 days | 4.7 | AASHTO TP 60 |
| Length Change, % of Total Length | | |
| 28 days soak/28 days dry | −0.0440/−0.0280 | ASTM C 157 |
| Set Times @ 72 F./22 C. at 2" (5 cm) | | |
| Initial | 30-35 minutes | |
| Final | 35-45 minutes | |
| Return to Service | | |
| Foot Traffic | 2-3 hours | |
| Wheeled Traffic | 5-6 hours | |

This product may be used as a rapid setting, turn-key repair material (cement+sand+stone). It may be mixed as multiple units using a conventional drum mixer. A strength gain of 2500 psi in 2 hours from the addition of water may be achieved. Depending on the specific application, hydration amounts range between 5-6 weight percent water. Working/placement time may be from 30-50 minutes. Ultimate strengths at 28 days are greater than 9,000 psi.

The following Table 4 sets forth preferred ranges, expressed in weight percentage relative to the weight of the cement composition prior to the addition of water, for each of the ingredients used in the cement of Example 1.

TABLE 4

| Materials | Preferred ranges | More preferred ranges |
|---|---|---|
| Class C fly-ash | 70-95 | 75-80 |
| Class F fly-ash | 1-25 | 10-15 |
| Silica Fume | | |
| Calcium Aluminate | | |
| Magnesium Oxide | 1-10 | 2-15 |
| Lime | | |
| Aluminum Sulfate | | |
| Boric Acid | 0.1-2 | 0.5-1.5 |
| Borax | | |
| Wollastonite | | |
| Potassium Citrate | 1-8 | 2-5 |
| Fibers | | |
| Water Reducers | | |
| Latex | | |
| Air Entraining Agent (AEA) | 0.0005-0.003 | 0.0005-0.002 |

Ex. #2

The ingredients listed in Tables 1 and 2 were blended together then hydrated with 7.94 weight percent water, compared to the total weight of the ingredients in Tables 1 and 2, prior to use. This produced a product with the following characteristics:

TABLE 5

Ex. #2

| Property | Results 4 in. × 8 in. cylinders | Test Method |
|---|---|---|
| Compressive Strengths, psi (MPa) | | |
| 2 hours | 2514 (14.3) | ASTM C 39 |
| 1 day - 24 hours | 5210 (35.9) | ASTM C 39 |
| 7 days | 7220 (49.8) | ASTM C 39 |
| 28 days | 9300 (64.1) | ASTM C 39 |
| Bond Strength, psi (MPa) | | |
| 1 day - 24 hours | 2004 (11.4) | ASTM C 882 |
| 7 days | 3018 (17.1) | ASTM C 882 |
| Flexural Strength, psi (MPa) | | |
| 7 days | 855 (5.9) | ASTM C 78 |
| 28 days | 1008 (6.9) | ASTM C 78 |
| Tensile Strength, psi (MPa) | | |
| 24 hours | 530 (3.7) | ASTM C 496 |
| 7 days | 790 (5.4) | ASTM C 496 |
| 28 days | 900 (6.2) | ASTM C 496 |
| Scaling Resistance, | | |
| 50 cycles | 0 | ASTM C 672 |
| Modulus of Elasticity, $10^5$ psi (GPa) | | |
| 28 days | 4.25 (2.9) | ASTM C 469 |
| Coefficient of Thermal Expansion, in/in/° F. | | |
| 28 days | 4.7 | AASHTO TP 60 |
| Length Change, % of Total Length | | |
| 28 days soak/28 days dry | 0.0230/−0.0430 | ASTM C 157 |
| Set Times @ 72 F./22 C. at 2" (5 cm) | | |
| Initial | 20-30 minutes | |
| Final | 30-40 minutes | |

This product may be used as a rapid setting, turn-key repair material (cement+sand+stone). It may be mixed as multiple units using a conventional drum mixer. A strength gain of 2500 psi in 2 hours from the addition of water may be achieved. Depending on the specific application, hydration amounts range between 6.5-8 weight percent water. Working/placement time may be from about 20-40 minutes. Ultimate strengths at 28 days are greater than 9,000 psi.

The following Table 6 sets forth preferred ranges, expressed in weight percentage relative to the weight of the cement composition prior to the addition of water, for each of the ingredients used in the cement of Example 2.

TABLE 6

| Materials | Preferred ranges | More preferred ranges |
|---|---|---|
| Class C fly-ash | 50-75 | 55-65 |
| Class F fly-ash | 1-10 | 1-5 |
| Silica Fume | 1-6 | 1-3 |
| Calcium Aluminate | 10-25 | 15-20 |
| Magnesium Oxide | 1-18 | 10-15 |
| Lime | | |
| Aluminum Sulfate | | |
| Boric Acid | | |
| Borax | .1-5 | 1-3 |
| Wollastonite | | |
| Potassium Citrate | 1-8 | 1.5-5 |
| Fibers | | |
| Water Reducers | | |

TABLE 6-continued

| Materials | Preferred ranges | More preferred ranges |
|---|---|---|
| Latex | 0.01-0.06 | 0.02-0.05 |
| Air Entraining Agent (AEA) | 0.0005-.005 | 0.001-.004 |

Ex. #3

The ingredients listed in Tables 1 and 2 were blended together then hydrated with 11.6% weight percent water, compared to the total weight of the ingredients in Tables 1 and 2, prior to use. This produced a product with the following characteristics:

TABLE 7

Ex. #3

| Property | Results 4 in. × 8 in. cylinders | Test Method |
|---|---|---|
| Compressive Strengths, psi (MPa) | | |
| 1 hour | 2500 | ASTM C 928 |
| 3 hours | 4636 | ASTM C 928 |
| 1 day - 24 hours | 5807 | ASTM C 928 |
| 7 days | 6255 | ASTM C 928 |
| 28 days | 6500 | |
| Bond Strength, psi (MPa) | | |
| 1 hour | 1700 | ASTM C 928 |
| 7 days | 2000 | ASTM C 928 |
| Flexural Strength, psi (MPa) | | |
| 7 days | 610 | ASTM C 928 |
| 28 days | 850 | ASTM C 928 |
| Tensile Strength, psi (MPa) | | |
| 7 days | 225 | ASTM C 928 |
| 28 days | 300 | ASTM C 928 |
| Scaling Resistance | | |
| 50 cycles | 0 | ASTM C 928 |
| Modulus of Elasticity, $10^5$ psi (GPa) | | |
| 28 days | 3.3 (2.2) | ASTM C 928 |
| Coefficient of Thermal Expansion, millions/F. | | |
| 28 days | 2.55 | ASTM C 928 |
| Length Change, % of Total Length | | |
| 28 days soak/28 days dry | testing | ASTM C 928 |
| Set Times @ 72 F./22 C. at 2" (5 cm) | | |
| Initial | 10-15 minutes | |
| Final | 15-20 minutes | |
| Return to Service | | |
| Foot Traffic | 40 minutes | |
| Wheeled Traffic | 2 hours | |

This product may be used as a rapid setting, turn-key repair material (cement+sand+stone). It may be mixed as a single bucket product using a drill mixer. A strength gain of 2500 psi 1 hour from the addition of water may be achieved. Depending on the specific application, hydration amounts range between 10 and 12 wt % water may be used. Ultimate strengths are greater than 6,000 psi.

The following Table 8 sets forth preferred ranges, expressed in weight percentage relative to the weight of the cement composition prior to the addition of water, for each of the ingredients used in the cement of Example 3.

TABLE 8

| Materials | Preferred ranges | More preferred ranges |
|---|---|---|
| Class C fly-ash | 50-75 | 55-65 |
| Class F fly-ash | | |
| Silica Fume | 1-6 | 2-3 |
| Calcium Aluminate | 10-25 | 15-20 |
| Magnesium Oxide | 1-18 | 10-15 |
| Lime | | |
| Aluminum Sulfate | | |
| Boric Acid | 0.1-1.5 | 0.2-0.5 |
| Borax | 0.1-5 | 0.2-1 |
| Wollastonite | | |
| Potassium Citrate | 1-8 | 1.5-5 |
| Fibers | | |
| Water Reducers | 0.1-0.3 | 0.1-0.2 |
| Latex | | |
| Air Entraining Agent (AEA) | 0.0005-.005 | 0.001-.004 |

Structural Concrete

Ex. #4

The ingredients listed in Tables 1 and 2 were blended together then hydrated with 3.8 weight percent water, compared to the total weight of the ingredients in Tables 1 and 2, prior to use. This produced a product with the following characteristics:

TABLE 9

Example #4

| Property | Results | Test Method |
|---|---|---|
| Compressive Strengths, psi (MPa) | | |
| 4 hours | 2200 (15.2) | ASTM C 39 |
| 1 day - 24 hours | 4340 (29.9) | ASTM C 39 |
| 7 days | 7360 (50.8) | ASTM C 39 |
| 28 days | 9370 (64.7) | ASTM C 39 |
| Bond Strength, psi (MPa) | | |
| 1 day - 24 hours | *TBD | ASTM C 882 |
| 7 days | *TBD | ASTM C 882 |
| Flexural Strength, psi (MPa) | | |
| 7 days | 712 (4.9) | ASTM C 78 |
| 28 days | 768 (5.3) | ASTM C 78 |
| Tensile Strength, psi (MPa) | | |
| 28 days | 750 (5.2) | ASTM C 496 |
| Scaling Resistance,) | | |
| 50 cycles | 0 | ASTM C 672 |
| Modulus of Elasticity, $10^5$ psi (GPa) | | |
| 28 days | 5.00 (3.4) | ASTM C 469 |
| Coefficient of Thermal Expansion, in/in/° F. | | |
| 28 days | 4.7 | AASHTO TP 60 |
| Length Change, % of Total Length | | |
| 28 days | *TBD | ASTM C 157 |
| 56 days | *TBD | ASTM C 157 |
| 252 days | *TBD | ASTM C 157 |
| Set Times @ 72 F./22 C. at 2" (5 cm) | | |
| Initial | 95 minutes | |
| Final | 105 minutes | |

This product may be made without the aggregates and then mixed with the aggregates listed in Table 2 by a customer. The product is designed to have a wide range of slumps, working times, and final set times, and is typically able to provide 2500 psi within 4-6 hours. This product has the option to be blended such that the chemical activator may be withheld until site conditions are optimum for application/use of the product. This can allow a transit truck 6 or more hours to deliver the product to a job site without the concrete setting or experiencing detrimental reactions in the product. Depending on the specific application, hydration amounts range between 3-7 weight percent water. Ultimate strength at 28 days exceed 9,000 psi.

The following Table 10 sets forth preferred ranges, expressed in weight percentage relative to the weight of the cement composition prior to the addition of water, for each of the ingredients used in the cement of Example 4.

TABLE 10

| Materials | Preferred ranges | More preferred ranges |
|---|---|---|
| Class C fly-ash | 70-95 | 75-85 |
| Class F fly-ash | 1-25 | 10-15 |
| Silica Fume | | |
| Calcium Aluminate | 1-15 | 4-10 |
| Magnesium Oxide | | |
| Lime | .5-5 | .5-1.5 |
| Aluminum Sulfate | .4-4 | .4-1.4 |
| Boric Acid | 0.1-2 | 0.5-1.0 |
| Borax | 0.1-5 | 0.1-2 |
| Wollastonite | | |
| Potassium Citrate | 1-8 | 2-6 |
| Fibers | 0.01-2 | .02-1 |
| Water Reducers | .01-2 | .05-.08 |
| Latex | | |
| Air Entraining Agent (AEA) | 0.0005-0.003 | 0.0005-0.002 |

Formulation for Volumetric Concrete Mixers

Ex. #5

The ingredients listed in Table 1 were blended together then hydrated with 4.5 weight percent water, compared to the total weight of the ingredients in Tables 1 and 2, prior to use. This produced a product with the following characteristics:

TABLE 11

| Ex. #5 | | |
|---|---|---|
| Property | Results | Test Method |
| Compressive Strengths, psi (MPa) | | |
| 2 hours | 3000 (20.7) | ASTM C 39 |
| 4 hours | 3200 (22.1) | ASTM C 39 |
| 1 day - 24 hours | 4200 (29.0) | ASTM C 39 |
| 7 days | 7200 (50.0) | ASTM C 39 |
| 28 days | 10000 (69.0) | ASTM C 39 |
| Bond Strength, psi (MPa) | | |
| 1 day - 24 hours | 2274 (15.7) | ASTM C 882 |
| 7 days | 3510 (24.2) | ASTM C 882 |
| Flexural Strength, psi (MPa) | | |
| 7 days | 700 (4.8) | ASTM C 78 |
| 28 days | 1000 (6.9) | ASTM C 78 |
| Tensile Strength, psi (MPa) | | |
| 7 days | TBD | ASTM C 496 |
| 28 days | 650 (4.5) | ASTM C 496 |

TABLE 11-continued

| Ex. #5 | | |
|---|---|---|
| Property | Results | Test Method |
| Scaling Resistance, | | |
| 25 cycles | 0 | ASTM C 672 |
| Modulus of Elasticity, $10^5$ psi (GPa) | | |
| 28 days | 5.0 (3.4) | ASTM C 469 |
| Coefficient of Thermal Expansion, in/in/° F. | | |
| 28 days | 4.7 (3.2) | AASHTO TP 60 |
| Length Change, % of Total Length | | |
| 28 days soak/28 days dry | −0.0200/−.0400 | ASTM C 157 |
| Set Times @ 72 F./22 C. at 2" (5 cm) | | |
| Initial | 20-30 minutes | |
| Final | 30-40 minutes | |

This product as formulated is intended to be produced in volumetric concrete trucks. The user adds locally procured aggregates in the proportions provided in Table 2 or otherwise required. The product is designed to work with minimum mixing in a high-shear mixer. A strength gain of 2500 psi is achieved in 2 hours. Volumetric mixing permits on-site production of required concrete. Volumetric mixers meter out the cement then add the requisite sand and stone and water per the mix design. Depending on the specific application, hydration amounts range between 4-7 weight percent water.

The following Table 12 sets forth preferred ranges, expressed in weight percentage relative to the weight of the cement composition prior to the addition of water, for each of the ingredients used in the cement of Example 5.

TABLE 12

| Materials | Preferred ranges | More preferred ranges |
|---|---|---|
| Class C fly-ash | 70-95 | 75-85 |
| Class F fly-ash | 1-25 | 10-15 |
| Silica Fume | 1-10 | 2-6 |
| Calcium Aluminate | 1-15 | 4-10 |
| Magnesium Oxide | | |
| Lime | 0.1-5 | 0.5-2 |
| Aluminum Sulfate | 0.1-5 | 0.5-2 |
| Boric Acid | 0.1-2 | 0.5-1.0 |
| Borax | 0.1-5 | 0.1-2 |
| Wollastonite | | |
| Potassium Citrate | 1-8 | 2-6 |
| Fibers | | |
| Water Reducers | .01-1.0 | .05-0.1 |
| Latex | | |
| Air Entraining Agent (AEA) | 0.0005-0.003 | 0.0005-0.002 |

Specialty Concretes

Ex. #6

The ingredients listed in Tables 1 and 2 were blended together then hydrated with 4.4 weight percent water, compared to the total weight of the ingredients in Tables 1 and 2. This produced a product with the following characteristics:

TABLE 13

Ex. #6

| Property | Results | Test Method |
|---|---|---|
| Compressive Strengths, psi (MPa) | | |
| 6 hours | 2605 (18.0) | ASTM C 39 |
| 1 day - 24 hours | 3860 (26.6) | ASTM C 39 |
| 7 days | 6215 (42.8) | ASTM C 39 |
| 28 days | 9300 (64.1) | ASTM C 39 |
| Bond Strength, psi (MPa) | | |
| 1 day - 24 hours | 2274 (15.7) | ASTM C 882 |
| 7 days | 3295 (22.7) | ASTM C 882 |
| Flexural Strength, psi (MPa) | | |
| 7 days | 855 (5.9) | ASTM C 78 |
| 28 days | 1008 (6.9) | ASTM C 78 |
| Tensile Strength, psi (MPa) | | |
| 7 days | 490 (3.4) | ASTM C 496 |
| 28 days | 720 (5.0) | ASTM C 496 |
| Scaling Resistance, | | |
| 50 cycles | 0 | ASTM C 672 |
| Modulus of Elasticity, $10^5$ psi (GPa) | | |
| 28 days | 4.25 (2.9) | ASTM C 469 |
| Coefficient of Thermal Expansion, in/in/° F. | | |
| 28 days | 4.7 | AASHTO TP 60 |
| Length Change, % of Total Length | | |
| 28 days soak/28 days dry | 0.0230/−0.0430 | ASTM C 157 |
| Set Times @ 72 F./22 C. at 2" (5 cm) | | |
| Initial | 35-45 minutes | |
| Final | 45-60 minutes | |

This is a cementitious, high-early strength concrete that may be used either as a repair product or as a structural concrete. The product includes fire resistant glass fibers. Within 24 hours of placement, this product may be exposed to intermittent temperatures up to 1500° F. (815° C.). It may be mixed in a conventional portable drum mixer for small area repair applications or in a transit or volumetric truck for larger applications. Depending on the specific application, hydration amounts range between 4-5 weight percent water.

The following Table 14 sets forth preferred ranges, expressed in weight percentage relative to the weight of the cement composition prior to the addition of water, for each of the ingredients used in the cement of Example 6.

TABLE 14

| Materials | Preferred ranges | More preferred ranges |
|---|---|---|
| Class C fly-ash | 65-90 | 70-85 |
| Class F fly-ash | 1-25 | 10-20 |
| Silica Fume | 0.5-5 | 1-3 |
| Calcium Aluminate | | |
| Magnesium Oxide | | |
| Lime | 0.1-5 | 0.5-3 |
| Aluminum Sulfate | | |
| Boric Acid | 0.1-2 | 0.1-0.5 |
| Borax | 0.1-5 | 1-3 |
| Wollastonite | | |
| Potassium Citrate | 1-8 | 2-6 |
| Fibers | 0.02-2 | 0.1-1 |
| Water Reducers | | |
| Latex | | |
| Air Entraining Agent (AEA) | 0.0005-0.003 | 0.0005-0.002 |

Ex. #7

The ingredients listed in Tables 1 and 2 were blended together, then hydrated with 9.3 weight percent water, compared to the total weight of the ingredients in Tables 1 and 2. This produced a sprayable concrete formulation. This formulation may be applied using various spray systems, including Shotcrete, Gunnite, mortar spray systems, and other custom sprayers. Unique properties of this product includes high early strength of at least 1000 psi within 2 hours, a wet viscosity to permit spray buildup of at least 1 inch thickness without having the product exhibit run, droop, or sag and a working time of at least 30 minutes. Depending on the specific application, hydration amounts range between 7-10 weight percent water.

The following Table 15 sets forth preferred ranges, expressed in weight percentage relative to the weight of the cement composition prior to the addition of water, for each of the ingredients used in the cement of Example 7.

TABLE 15

| Materials | Preferred ranges | More preferred ranges |
|---|---|---|
| Class C fly-ash | 40-65 | 45-60 |
| Class F fly-ash | 10-40 | 20-35 |
| Silica Fume | 1-6 | 2-5 |
| Calcium Aluminate | | |
| Magnesium Oxide | 1-15 | 5-10 |
| Lime | | |
| Aluminum Sulfate | | |
| Boric Acid | 0.1-2 | 0.5-1.5 |
| Borax | | |
| Wollastonite | 1-5 | 1.5-4 |
| Potassium Citrate | 1-8 | 2-4 |
| Fibers | 0.1-2.0 | 0.1-1.5 |
| Water Reducers | 0.1-0.4 | 0.1-0.3 |
| Latex | | |
| Air Entraining Agent (AEA) | | |

Ex. #8

The ingredients listed in Tables 1 and 2 were blended together then hydrated with 9.1% water. This produced a grout and mortar formulation. These products are designed to work like a conventional grout (~120 minutes of working time with conventional mixing requirements), yet capable of achieving an ultimate strength of at least 10,000 psi in 28 days. Depending on the specific application, hydration amounts range between 8-12 weight percent water.

The following Table 16 sets forth preferred ranges, expressed in weight percentage relative to the weight of the cement composition prior to the addition of water, for each of the ingredients used in the cement of Example 8.

TABLE 16

| Materials | Preferred ranges | More preferred ranges | |
|---|---|---|---|
| Class C fly-ash | 50-75 | 55-70 | 64.8 |
| Class F fly-ash | 10-30 | 12-25 | 18.5 |
| Silica Fume | 1-6 | 2-4 | 2.4 |
| Calcium Aluminate | | | |
| Magnesium Oxide | 1-5 | 1-3 | 1.8 |
| Lime | 1-5 | 1-3 | 1.8 |
| Aluminum Sulfate | 0.1-2 | 0.5-1.5 | 0.9 |
| Boric Acid | 0.1-2 | 0.5-1.8 | 1.2 |
| Borax | 0.5-2.5 | 0.5-2 | 1.4 |
| Wollastonite | | | |
| Potassium Citrate | 2-10 | 5-9 | 7.4 |

TABLE 16-continued

| Materials | Preferred ranges | More preferred ranges |
|---|---|---|
| Fibers | | |
| Water Reducers | | |
| Latex | | |
| Air Entraining Agent (AEA) | | |

The above formulations provide a unique and beneficial combinations of high strength, variable set times, and quick return to service.

Additional specialty formulations may include:

Soil stabilizer—A soil stabilization product may be produced by mixing a cement compound, such as the Ex. 4 cement, with a wide range of soil types to produce a moderate strength soil. It may be made of ~10% cement. The product may be formed utilizing various mixing methodologies including mixing the cement into soil under dry conditions and then spraying the product with water. Ultimate strengths are ~1000 psi, which is far superior to conventional approaches that use a similar % of Portland cement. A unique feature of the product is the ability to achieve strengths capable of sustaining vehicle traffic far earlier than current Portland cement soil stabilizers. Another unique feature of the product is its ability control the leaching of heavy metals and other chemical contaminants.

Concrete blocks—the cement described herein, for example the Ex. 4 formulation may be blended with sand and aggregate to produce concrete blocks. Concrete blocks made according to this approach may offer the following benefits: 1) achieve a high early strength of >1000 psi in a 2-4 hour period after addition of water; 2) achieve high early strengths without the need for steam curing, a requirement for conventional concrete block; 3) achieve ultimate (28 day) strengths of up to 10,000 psi; 4) produce blocks with very low hydraulic porosity.

Armor—the cement may also be used to produce an armor by blending the cement with sand and high strength fibers. These formulations can produce a compressive strength of 10,000 psi within 24 hours of mixing, and a compressive strength of over 20,000 psi in 28 days.

Roller compacted concrete (RCC)—The cement may also be used in the production of roller compacted concrete (RCC). In this application, the cement is blended with sand and coarse aggregate such that the total cement content as a % of concrete is 10-15%. The product essentially has zero slump, and is applied mechanically using conventional concrete/asphalt spreader equipment. After spreading, the product may be compacted with a vibratory roller. The product can receive foot traffic immediately, and can achieve compressive strengths of over 3000 psi in 24 hours, and compressive strengths of over 8000 psi in 28 days.

Manufacturing Methods

The small area repair products (such as Examples 1-3) may be produced by, for example, measuring out the ingredients for each product package, or "bucket," individually using loss-in-weight powder feeders, once measured, each bucket may then be rapidly blended prior to sealing for storage and or/shipment. This technique reduces formulaic variations between units. Alternatively, these products may be produced by any known techniques including ribbon blending. The small area products may be 100% pre-blended, so their mixing procedure prior to use is simple: product, water, and mixing.

The large area products (such as Example 4) may be produced by mixing all the ingredients except for the activator prior to use. The activator may then be added at the time when you need the concrete to initiate its reaction. Once the activator is added, the chemical reaction leading to final set has been started. The specific blend will determine how much working time is available prior to the final set.

As example, a transit truck may load a mix according to Example 4 at a batch plant. The transit truck now has 4-6 hours or more before the concrete will no longer be useable. At any point in that time period, the activator, as a liquid or as a solid power, may be added (most likely at the construction site), and the concrete may be placed. This ability provides a huge advantage over Portland cement concrete, which typically has 90 minutes of acceptable working time from the moment the transit truck is loaded at the batch plant.

The volumetric mixable products (for example, Examples 5 and 7) may be made by adding uniform portions of cement, stone, and sand under remote control operation. The cement portion containing both the accelerator and the retarder may be blended with sand and stone in the high shear mixer. As an option to this approach, the accelerant and retarder may be added either in powder or liquid form.

This application discloses several numerical ranges in the text and figures. The numerical ranges disclosed inherently support any range or value within the disclosed numerical ranges even though a precise range limitation is not stated verbatim in the specification because this invention can be practiced throughout the disclosed numerical ranges.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

What is claimed is:

1. An article of manufacture comprising a hydrated and hardened cement composition comprising a pozzolan powder;
   two or more activators, at least one of which has a pH between 6 and 9; and
   a retarder,
wherein the hydratable cement has a calcium content expressed as the oxides of 15 wt % or more based on the total weight of the hydratable cement; and
   wherein said activator having a pH of between about 6 and about 9 accounts for greater than 50% of the total weight of activators in said hydratable cement.

2. An article of manufacture comprising a hydrated and hardened cement composition comprising a pozzolan powder;
one or more pH neutral activators; and
a retarder,
wherein the hydratable cement has a calcium content expressed as the oxides of 15 wt % or more based on the total weight of the hydratable cement, and
wherein the pH neutral activators account for greater than 50% of the total weight of activators in said hydratable cement; and
wherein the hydratable cement has less than 20% by weight Portland cement based on the total weight of the hydratable cement.

* * * * *